United States Patent
Kopp et al.

(10) Patent No.: US 7,143,646 B2
(45) Date of Patent: Dec. 5, 2006

(54) SENSOR

(75) Inventors: Thomas Kopp, Wolfach (DE); Hermann Dieterle, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 11/001,567

(22) Filed: Dec. 2, 2004

(65) Prior Publication Data

US 2006/0037391 A1    Feb. 23, 2006

(30) Foreign Application Priority Data

Dec. 4, 2003    (DE) ............................... 103 57 041

(51) Int. Cl.
*G01F 23/00*    (2006.01)

(52) U.S. Cl. .................. 73/290 R; 73/700; 73/706; 73/73; 73/753; 73/756

(58) Field of Classification Search .............. 73/290 R, 73/730, 706, 753, 756, 700
See application file for complete search history.

(56) References Cited

U.S. PATENT DOCUMENTS

| | | | |
|---|---|---|---|
| 2,460,304 A | | 2/1949 | McGee |
| 3,264,602 A | * | 8/1966 | Schwartz ..................... 439/578 |
| 3,403,671 A | * | 10/1968 | Flaherty et al. ............... 73/621 |
| 4,594,891 A | * | 6/1986 | Benz et al. ............... 73/290 V |
| 4,746,305 A | | 5/1988 | Nomura |
| 4,912,815 A | * | 4/1990 | Jenkins ....................... 24/122.3 |
| 5,111,699 A | * | 5/1992 | Walstra et al. ................. 73/754 |
| 5,142,914 A | * | 9/1992 | Kusakabe et al. ............. 73/723 |
| 6,508,130 B1 | * | 1/2003 | Werner et al. ................ 73/756 |
| 6,619,117 B1 | * | 9/2003 | Reimelt ........................ 73/219 |
| 6,711,950 B1 | * | 3/2004 | Yamaura et al. ............... 73/317 |
| 6,718,828 B1 | * | 4/2004 | Kopp et al. ................... 73/730 |
| 7,036,380 B1 | * | 5/2006 | Fessele et al. ................ 73/706 |

FOREIGN PATENT DOCUMENTS

GB    2 324 421 A    10/1998

* cited by examiner

*Primary Examiner*—Hezron Williams
*Assistant Examiner*—Samir M. Shah
(74) *Attorney, Agent, or Firm*—Nath & Associates; Gregory B. Kang; Derek Richmond

(57) ABSTRACT

The invention relates to a sensor, with a sensor housing (8) whose through-hole is intended for a connecting cable (1) that is attached to the sensor (11, 12), such that the connecting cable (1) is surrounded by a pressure spring element (4). In accordance with the invention, a conical supporting sleeve (3) is positioned next to the pressure spring element (4); also furnished is a cable seat housing (2) of thermoplastic material with a conical hole. The conical supporting sleeve (3) engages with this conical hole. A cable jacket (1b) belonging to the connecting cable (1) is squeezed between the conical supporting sleeve (3) and the cable seat housing (2), while the pressure spring element (4) is encompassed by a spring housing, (5) and the cable seat housing (2) can be secured to the sensor housing (8) by means of a cap sleeve (7).

6 Claims, 3 Drawing Sheets

SENSOR

BACKGROUND OF THE INVENTION

1. Field of the Invention

The invention relates to a sensor, particularly a level sensor, a pressure measuring transformer, or the like, which exhibits a housing that contains a sensor and exhibits a cable bushing that can be detached from the housing and inserted into the housing, such that the cable bushing has at least one form-seal.

2. Background Art

FIG. 1 shows a sensor 10 known to the prior art, with a housing 11 containing an electric measuring transformer 12 and a sensor 13. The sensor also exhibits a cable bushing 14 for guiding a cable 15. The cable bushing 14 may exhibit an elastomer form-fitting seal 17, or a plurality of elastomer form-fitting seals, which are compressed by a pressure screw. Coming out of the cable are leads 19, which are inserted in the electrical measuring transformer by means of plug elements 100 that may take of the form of impact connectors, flat plugs, or lead terminal sleeves. To improve the seal, the elastomer form-fitting seals 17 and 18 are often glued to the cable 15 and a cable seat 101. In the disassembly process, which can involve, e.g., a servicing event, the glued-on elastomer form-fitting seals 17 and 18 are necessarily damaged, with the result that they can no longer be used and must be replaced by new ones. When there is no adhesive connection between the cable 15 and the elastomer seals 17 and 18, said elastomer form-fitting seals 17 and 18, over the course of time, may cling so firmly, both the to cable 15 and to the cable seat 101, that the elastomer seals 17 and 18 are inevitably destroyed when the cable bushing 14 is removed. To prevent the destruction of the elastomer seals 17 and 18 during disassembly of the cable bushing 14, means 16 are frequently employed to reduce friction, but over the course of time these means are washed out by the media surrounding the sensor 10, or they decompose or evaporate at high temperatures. For this reason, it is not possible in the present art to disassemble the cable bushing 14 without destroying the elastomer form-fitting seals 17 and 18. In the course of disassembling the cable bushing 14 the plug elements 100 are necessarily removed from the electronic measuring transformer 12. Detachment of the plug elements 100 while supply voltage is being applied may result in, e.g., an undesired short-circuit due to rotating motion in the cable bushing 14.

SUMMARY OF THE INVENTION

The invention is based on the problem of improving a sensor of the initially described type in such a way that, in the future, the form-fitting seal is not damaged during assembly or disassembly.

The invention solves this problem with a sensor of the initially described type, such that, according to the invention, the one or more form-fitting seals are surrounded by a housing for the cable bushing. As a result, the one or more form-fitting seals cannot adhere to or rub against the housing of the sensor during assembly or disassembly of the cable bushing, and this reliably excludes damage to the form-fitting seal and maintains without change the seal between the cable and the one or more form-fitting seals. It is therefore possible, e.g., during servicing, for an electrical connection attached to the cable bushing to be quickly and easily re-plugged into a different sensor.

The cable bushing housing can be screwed together with the sensor housing by means of a union nut that can be screwed onto the sensor housing. This allows the cable bushing to be quickly and reliably connected to the sensor housing with a minimum of manual activity.

To increase the sealing effect of the form-fitting seal the latter can be allowed to interact with a spring element, e.g., a pressure spring. The spring element serves to compress the form-fitting seal surrounding the bushing and thereby enhances the sealing effect of the form-fitting seal.

To optimally transmit the spring force to the form-fitting seal and to protect it from damage caused by the pressure spring, a ring can be positioned between the pressure spring and the form-fitting seal.

For the purpose of easy and quick assembly a spring housing holding the pressure spring can be screwed into the cable bushing.

To more easily assemble and disassemble the cable bushing to or from the sensor housing a ventilation and aeration line that opens into the housing interior can be positioned in the cable. When the cable bushing is mounted on the housing the air located in the housing interior can escape into the environment through the aeration line. On the other hand, when the cable bushing is dismounted from the housing, air can enter the housing interior through the ventilation line, and when the cable bushing is withdrawn from the housing there will be no negative pressure in the housing interior; this negative pressure would make it more difficult to remove the cable bushing from the sensor housing.

At the free end of the spring housing it is possible to apply electrical plug connections that are rigidly attached to the cable bushing and that, even when the cable bushing is being disassembled and supply voltage is being applied, can be withdrawn from the connection sleeves connected to them, without the danger of a short circuit.

To ensure an optimal sealing effect between the cable bushing housing and the sensor housing an O-ring can be positioned between the cable bushing housing and the sensor housing.

BRIEF DESCRIPTION OF THE SEVERAL VIEWS OF THE DRAWINGS

In the following an exemplary embodiment of the sensor according to the invention will be described in greater detail on the basis of the attached drawing. Shown are.

DETAILED DESCRIPTION

Figure 1:
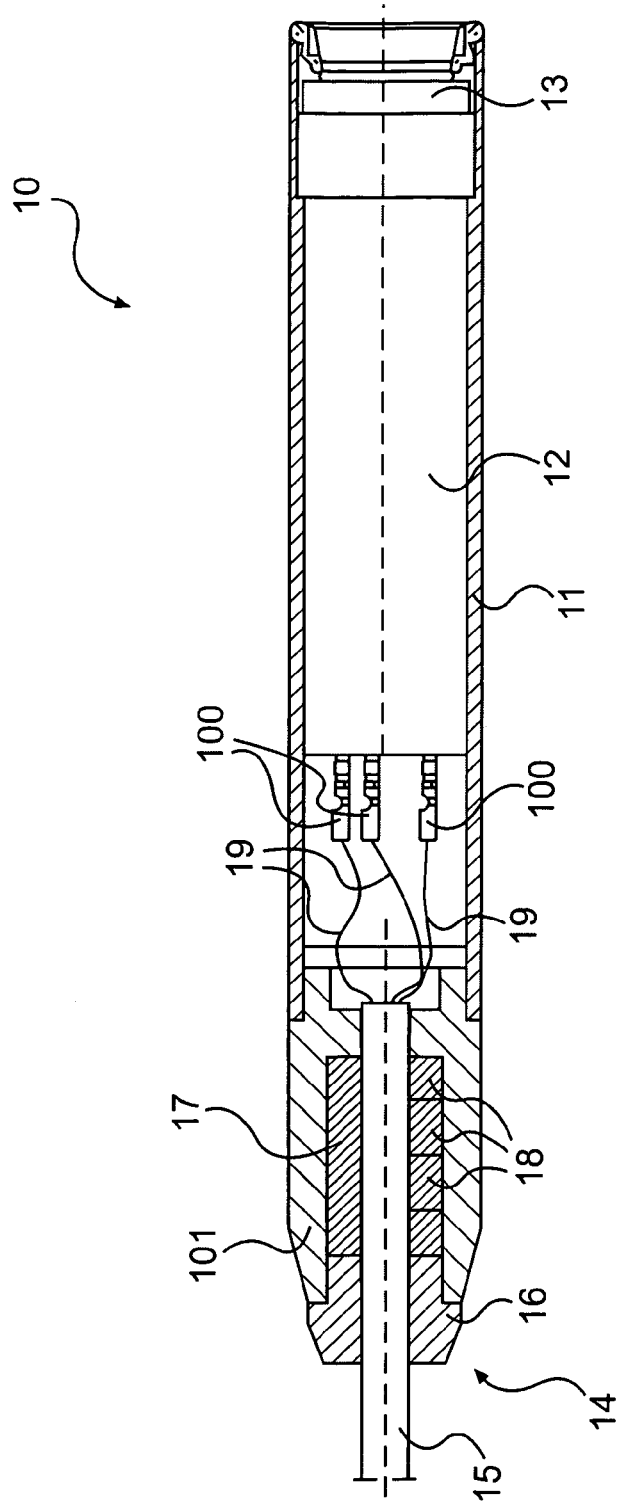
FIG. 1 a longitudinal section through a sensor known to the prior art
Figure 2:
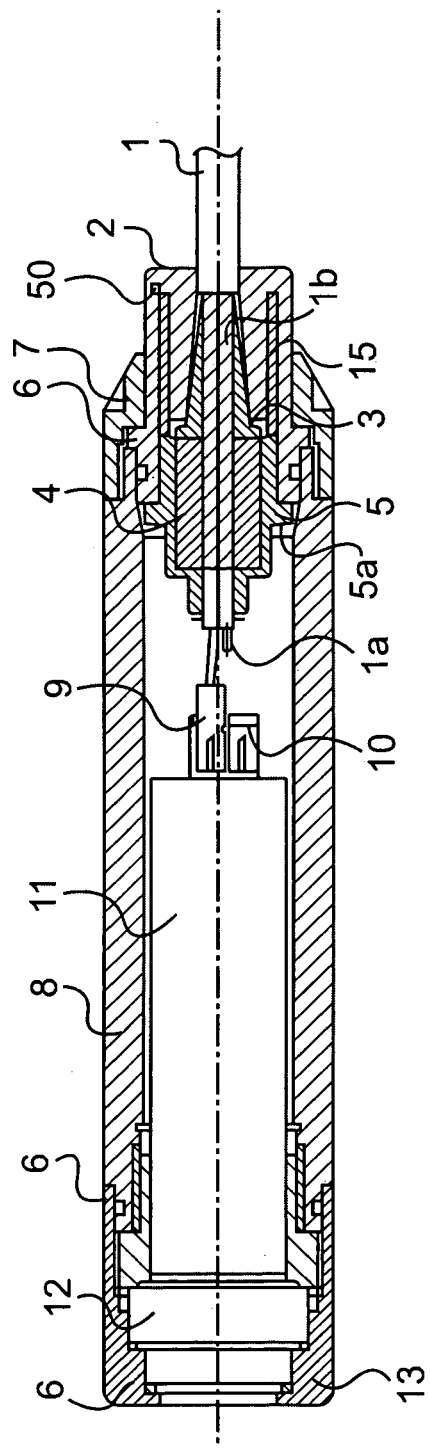
FIG. 2 a longitudinal section through an initial sensor according to the invention FIG. 3 a longitudinal section through a second sensor according to the invention

FIG. 2 depicts the sensor according to the invention. The sensor exhibits a tubular sensor housing 8, with an electrical measuring transformer 11 positioned in it, such that this electronic measuring transformer 11 can be connected to a connecting cable 1, shown on the right side in FIG. 2, by means of a sleeve housing 9 and a pin tray 10, in a manner yet to be explained. On the opposite side, the electronic measuring transformer 11 exhibits a sensor element 12, which is positioned in a cylindrical housing part 13. This cylindrical housing part 13 is in contact with the sensor element 12 and plays the role of a seal via O-ring seals 6; it is also in contact with the sensor element 12. The housing part 13 and the sensor housing part 8 are joined together, e.g., by a screwing action. Other possibilities for attachment are also conceivable.

The cable 1 is electrically connected to the electrical measuring transformer 11 in a special manner, which is explained in the following. The connecting cable 1 is insulated on its front end in such a way that an inner conductor is attached to the sleeve housing 9. This sleeve housing 9 is provided in order to be plugged into a suitable plug-in connection of the electrical measuring transformer 11. In addition, the connection cable 1 has an inside ventilation cable component 1a on its front, free end. This ventilation 1a is optional and does not have to be provided.

Figure 3:
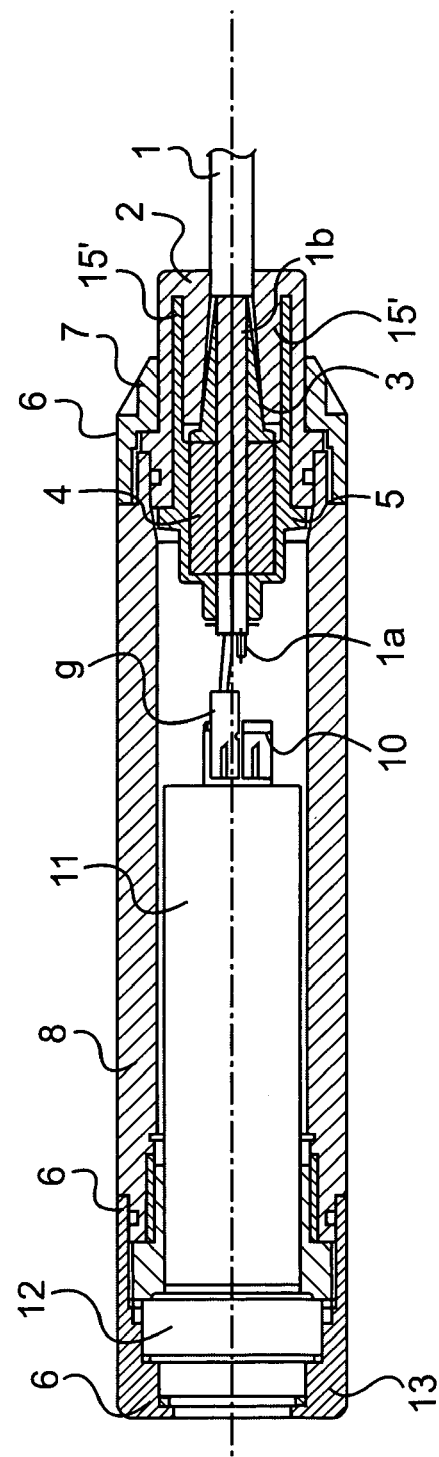

Positioned around the connecting cable 1 is the cable seat 2, which will ideally be made of plastic. For reasons of elasticity a ring-shaped hole concentric with the axis of the cable 1 is formed into this cable seat 2; a metallic supporting ring 50 will ideally be mounted in it. The cable seat 2 also has a central, conically widening hole, inside of which is mounted a supporting sleeve 3, which is also conical in shape. The cable 1 is prepared in such a way that the cable jacket 1b in mounted condition is squeezed between the wall of the cable seat 2 and the outer wall of the conical supporting sleeve 3. Positioned on the wall of the supporting sleeve 3 that runs vertical to axis of the cable jacket 1b as shown in FIG. 2 left, is a pressure spring element 4, which here takes the form of a cylindrically shaped elastic part. Surrounding this pressure spring element 4 is a spring housing 5. This spring housing 5 lies flush with an adjacent annular sleeve 15. As shown in FIG. 3, the spring housing 5 can also be designed to form a single piece 15' with the annular sleeve 15. As shown on the left in FIGS. 2 and 3, the rim of the spring housing 5 grips the pressure spring element 4 circumferentially and continues as a sleeve with a diminished diameter toward the sleeve housing 9. Half-way along its length the spring housing 5 also exhibits a projecting hexagon 5a that revolves and simultaneously serves as a stop for the cable seat housing 2; it also assists in the mounting process. The cable seat housing 2 exhibits a revolving annular groove in which another O-ring 6 is positioned.

The entire configuration consisting of cable seat housing 2, annular sleeve 15 with the conical supporting sleeve 3 contained in it, pressure spring element 4, and spring housing 5 form one structural unit, which can be secured to the sensor housing 8 with a cap sleeve 7.

The essential advantage of the design according to the invention, as depicted, e.g., in FIGS. 2 and 3, rests in the fact that it eliminates the destruction of the thermoplastic plastic housing, as occurs in the case of conventional cable seals.

When the sensor is replaced, the connecting cable 1, which was previously installed in a different sensor, is not pinched. As a result the penetration of media, e.g., liquids, into the measuring probe is effectively prevented. With this measure the temperature of the media can be raised to the thermal limit of the electronic equipment involved, and the sensor according to the invention can be used to measure media which will not lead to failure of the probe, despite swelling of the plastic. In addition, the measuring probe according to the invention can be used in media for which the elastomers in the cable seal are not durable, since the form-fitting seals from high-grade elastomer materials, e.g., "Kalrez", are not available from stock and are unmarketable relative to the cost of the apparatus.

The invention claimed is:

1. A sensor housing, comprising
   a housing (8) containing a sensor (11, 12), with a hole running through which is a connecting cable (1) for attachment to the sensor (11, 12), such that the connecting cable (1) is surrounded by a pressure spring element (4),
   wherein a conical support sleeve (3) is positioned next to the pressure spring element (4), and a plastic cable seat housing (2) of thermoplastic material exhibits a conical hole in which the conical supporting sleeve (3) engages, and where a cable jacket (1b) belonging to the connecting cable (1) is squeezed between the conical supporting sleeve (3) and the cable seat housing (2), and an annular sleeve that reinforcingly surrounds said plastic cable seat housing and where the pressure spring element (4) is surrounded by a spring housing (5), and the cable seat housing (2) can be secured to the sensor housing (8) by means of a cap sleeve (7).

2. A sensor housing according to claim 1, wherein a metal supporting ring is positioned in the cable seat housing (2).

3. A sensor housing according to claim 2, wherein the spring housing (5) and the supporting ring form a single piece.

4. A sensor housing according to claim 2, wherein the supporting ring comprises a material that has a greater strength than the cable seat housing (2).

5. A sensor housing according to claim 1, wherein the pressure spring element (4) takes the form of a flat spiral spring.

6. A sensor housing according to claim 1, wherein the pressure spring element (4) is a cylindrical part made of an elastic material.

* * * * *